United States Patent
Wang et al.

(10) Patent No.: US 11,771,020 B2
(45) Date of Patent: Oct. 3, 2023

(54) PROCESSES FOR DIRECT SEEDING OF GUAYULE

(71) Applicant: Bridgestone Corporation, Chuo-ku (JP)

(72) Inventors: Guangyao Wang, Chandler, AZ (US); David A. Dierig, Phoenix, AZ (US)

(73) Assignee: Bridgestone Corporation, Chuo-ku (JP)

( * ) Notice: Subject to any disclaimer, the term of this patent is extended or adjusted under 35 U.S.C. 154(b) by 1070 days.

(21) Appl. No.: 16/486,627

(22) PCT Filed: Feb. 15, 2018

(86) PCT No.: PCT/US2018/018293
§ 371 (c)(1),
(2) Date: Aug. 16, 2019

(87) PCT Pub. No.: WO2018/152280
PCT Pub. Date: Aug. 23, 2018

(65) Prior Publication Data
US 2020/0000008 A1    Jan. 2, 2020

Related U.S. Application Data

(60) Provisional application No. 62/599,185, filed on Dec. 15, 2017, provisional application No. 62/460,359, filed on Feb. 17, 2017.

(51) Int. Cl.
*A01G 24/00* (2018.01)
*A01G 24/22* (2018.01)
*A01G 24/28* (2018.01)
*A01C 1/00* (2006.01)
*A01C 7/00* (2006.01)

(52) U.S. Cl.
CPC ............... *A01G 24/00* (2018.02); *A01C 1/00* (2013.01); *A01C 7/006* (2013.01); *A01G 24/22* (2018.02); *A01G 24/28* (2018.02); *A01N 2300/00* (2013.01)

(58) Field of Classification Search
CPC ........ A01G 24/00; A01G 24/22; A01G 24/28; A01N 23/00; A01N 2300/00; A01C 1/00; A01C 1/06; A01C 1/08; A01C 7/006
See application file for complete search history.

(56) References Cited

U.S. PATENT DOCUMENTS

| | | | |
|---|---|---|---|
| 1,171,559 A * | 2/1916 | Taylor | A01G 17/085 47/1.01 R |
| 1,735,835 A | 11/1929 | McCallum | |
| 1,753,184 A * | 4/1930 | Spence | A01N 3/00 524/925 |
| 2016/0073577 A1 | 3/2016 | Schutt | |

FOREIGN PATENT DOCUMENTS

| | | |
|---|---|---|
| WO | 2016-040477 A1 | 3/2016 |
| WO | 2017-031277 A1 | 2/2017 |
| WO | 2017-044545 A1 | 3/2017 |
| WO | 2019-118692 A1 | 6/2019 |

OTHER PUBLICATIONS

International Search Report and Written opinion from application No. PCT/US2018/0182931, dated May 25, 2018 (13 pages).
International Search Report from application No. PCT/US2018/065397, dated Mar. 19, 2019 (3 pages).
Written Opinion from application No. PCT/US2018/065397, dated Jun. 2019 (7 pages).
McGinnies, William G., et al., Guayule Rubber Production: the World War II Emergency Project: A Guide to Future Development, published 1980.
Jorge, Maral Henrique Amici, "Germination and Characterization of Guayule Seed," dissertation, 2005.
Foster, M.A., et al., "Direct-Seeding Techniques for Guayule Stand Establishment in West Texas," J. Prod. Agric., vol. 5, No. 1, pp. 163-167 (1992).
Foster, M.A., et al., "Performance of Direct-Seeded and Transplanted Guayule," Industrial Crops and Products, vol. 15, pp. 23-31 (2002).
Foster, M.A., et al., "Response of Direct-Seeded Guayule to Preemergence Herbicides," Journal American Oil Chemists' Society, vol. 70, No. 12, pp. 1239-1240 (1993).
Foster, M.A., et al., "Establishing New Guayule Lines by Direct Seeding," Industrial Crops and Products, vol. 9, pp. 93-100 (1999).
Dissanayake, P., et al., "Direct Seedings as an Alternative to Transplanting for Guayule in Southeast Queensland," vol. 27, pp. 393-399 (2008).
"Are Seed Starting Mixes Worth Your Money?", downloaded from http://www.underwoodgardens.com/are-seed-starting-mixes-worth-your-money/ on Feb. 1, 2017 (no author listed).
Grubinger, Vern, "Potting Mixes for Organic Growers," downloaded from https://www.uvm.edu/vtvegandberry/factsheets/pottingmix.html on Feb. 1, 2017.
Foster, M.A., et al., "Guayule Agronomics: Establishment, Irrigated Production, and Weed Control," Industrial Crops and Products, vol. 22, pp. 27-40 (2005).

* cited by examiner

*Primary Examiner* — Alicia Torres
(74) *Attorney, Agent, or Firm* — Meredith E. Hooker; Jenny L. Sheaffer

(57) ABSTRACT

Processes for direct seeding of guayule seeds into a field and fields produced by the processes. According to these direct seeding processes, treated guayule seeds are mixed with a seed starting mixture to produce a planting mixture that is applied to exposed soil of a field. The applied planting mixture is then pressed or compressed which facilitates germination of the guayule seeds into seedlings.

21 Claims, No Drawings

PROCESSES FOR DIRECT SEEDING OF GUAYULE

This application is a national stage application of PCT/US2018/018293 filed Feb. 15, 2018, which claims the benefit of U.S. Provisional Application Ser. No. 62/460,359 filed Feb. 17, 2017 and U.S. Provisional Application Ser. No. 62/599,185 filed Dec. 15, 2017, which are incorporated herein by reference.

FIELD OF THE DISCLOSURE

The present disclosure relates to processes for the direct seeding of guayule into fields and to fields produced by such processes.

BACKGROUND

The guayule plant (*Parthenium argentatum*) is a woody shrub which produces rubber within its cells. Guayule plants reproduce from seed. Guayule seeds are small in size with approximately 1400-2000 guayule seeds being contained within one gram of dry seed matter. Guayule is usually established in fields by transplanting of seedlings produced from nurseries or greenhouses.

SUMMARY

Disclosed herein are processes for direct seeding of guayule into fields and fields produced by the processes.

In a first embodiment, a process is provided for direct seeding of guayule seeds into a field. The process comprises: (a) providing treated guayule seeds and a field comprising soil with an exposed surface, (b) mixing the treated guayule seeds with a seed starting mixture to produce a planting mixture comprising about 0.05 to about 5 kg of the treated guayule seeds per 100 gallons of seed starting mixture, (c) applying portions of the planting mixture to the exposed surface of the soil, (d) pressing the portions of the planting mixture, and (e) allowing the guayule seeds of (d) to germinate into seedlings.

In a second embodiment, a process is provided for direct seeding of guayule seeds into a field. The process comprises: (a) providing a field comprising soil with an exposed surface, (b) providing a planting mixture comprising a combination of treated guayule seeds and seed starting mixture wherein the treated guayule seeds are present in an amount of about 0.05 to about 5 kilograms per 100 gallons of seed starting mixture, preferably about 0.1 to about 0.5 kilograms per 100 gallons of seed starting mixture, (c) applying portions of the planting mixture to the exposed surface of the soil, (d) pressing the portions of the planting mixture into the soil, and (e) allowing the guayule seeds of (e) to germinate into seedlings.

In a third embodiment, a field which has been direct seeded with guayule according to the process of the first or second embodiment is provided.

DETAILED DESCRIPTION

Disclosed herein are processes for direct seeding of guayule into fields and fields produced by the processes.

In a first embodiment, a process is provided for direct seeding of guayule seeds into a field. The process comprises: (a) providing treated guayule seeds and a field comprising soil with an exposed surface, (b) mixing the treated guayule seeds with a seed starting mixture to produce a planting mixture comprising about 0.05 to about 5 kg of the treated guayule seeds per 100 gallons of seed starting mixture, (c) applying portions of the planting mixture to the exposed surface of the soil, (d) pressing the portions of the planting mixture, and (e) allowing the guayule seeds of (d) to germinate into seedlings.

In a second embodiment, a process is provided for direct seeding of guayule seeds into a field. The process comprises: (a) providing a field comprising soil with an exposed surface, (b) providing a planting mixture comprising a combination of treated guayule seeds and seed starting mixture wherein the treated guayule seeds are present in an amount of about 0.05 to about 5 kilograms per 100 gallons of seed starting mixture, preferably about 0.1 to about 0.5 kilograms per 100 gallons of seed starting mixture, (c) applying portions of the planting mixture to the exposed surface of the soil, (d) pressing the portions of the planting mixture into the soil, and (e) allowing the guayule seeds of (e) to germinate into seedlings.

In a third embodiment, a field which has been direct seeded with guayule according to the process of the first or second embodiment is provided.

Definitions

The terminology as set forth herein is for description of the embodiments only and should not be construed as limiting the invention as a whole.

As used herein, the term "majority" refers to more than 50% and unless indicated to the contrary encompasses 100%.

As used herein, the term "minority" refers to less than 50% and unless indicated to the contrary encompasses 0%.

As used herein, the term "acre" refers to 4,840 square yards (with a yard corresponding to 3 feet). One acre corresponds to approximately 0.405 hectares and values presented in acres should be understood to be also disclosed in corresponding hectares.

Direct Seeding

As discussed above, the processes of the first and second embodiments disclosed herein are directed to direct seeding of guayule seeds into a field. Direct seeding involves placement of seeds directly into the soil of a field in which the seeds germinate and grow into plants. Direct seeding can be contrasted with the placement of seedlings into a field, which seedlings may have been originally grown from seeds planted in a medium located in a greenhouse. According to the first and second embodiments, a planting mixture comprising treated guayule seeds and seed starting mixture is used in the direct seeding process. More specifically, according to the first and second embodiments, portions of the planting mixture are applied to the exposed surface of the soil. In other words, the processes of the first and second embodiments comprise applying portions of the planting mixture to the exposed surface of the soil. In certain embodiments of the first and second embodiments, the portions are applied in spaced intervals to rows; in certain such embodiments, each row (or bed of the row) is spaced about 20 to about 80 inches apart or 20-80 inches apart (e.g., 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, or 80 inches apart), preferably about 30 to about 50 inches apart or 30-50 inches apart, or about 30 to about 42 inches apart or 30-42 inches apart. In certain embodiments of the first and second embodiments, the portions are applied in spaced intervals to rows; in certain such embodiments, each row (or bed of the row) is spaced about 50 to about 200 centimeters apart or 50-200 centimeters apart (e.g., 50, 55, 60, 65, 70, 75, 80, 85, 90, 95, 100, 110, 120, 130, 140, 150, 160, 170, 180, 190, or 200 centimeters apart), preferably about 75 to about 120 centimeters apart or 75-120 centimeters apart, or about 75 to about 105 centimeters apart or 75-105 centimeters apart. As used herein, spacing between beds or rows refers to spacing from the center of one row or bed to the center of an adjacent row or bed. In those embodiments of the first and second embodiments wherein the soil to which the portions are applied has been plowed into raised beds, the foregoing row spacing refers to the distances between center points of each bed. In certain embodiments of the first and second embodiments, portions are applied in rows and portions within a given row are linearly spaced about 0.5 to about 36 inches apart or 0.5-36 inches apart (e.g., 0.5, 1, 2, 4, 6, 8, 10, 12, 14, 16, 18, 20, 22, 24, 26, 28, 30, 32, 34, or 36 inches apart), preferably about 6 to about 24 inches apart or 6-24 inches apart, or about 10 to about 18 inches apart or 10-18 inches apart. In certain embodiments of the first and second embodiments, portions are applied in rows and portions within a given row are linearly spaced about 1 to about 90 centimeters apart or 1-90 centimeters apart (e.g., 1, 5, 10, 15, 20, 25, 30, 35, 40, 45, 50, 55, 60, 65, 70, 75, 80, 85, or 90 centimeters apart), preferably about 15 to about 60 centimeters apart or 15-60 centimeters apart, or about 25 to about 45 centimeters apart or 25-45 centimeters apart. In order to facilitate placement of the portions into one or more of the foregoing spaced intervals, the soil of the field is preferably plowed into rows having raised beds and furrows (as discussed further infra). In certain embodiments of the first and second embodiments, the portions are placed in a continuous strip to rows (i.e., there are no separate portions with spacing therebetween); in certain such embodiments, the rows are spaced apart as described above.

According to the processes of the first and second embodiments, the size of the portions of planting mixture that are applied to the soil may vary. Factors such as the concentration of the treated guayule seeds within the planting mixture and the desired spacing interval of the portions may influence the preferred size of the portion of planting mixture. In certain embodiments of the first and second embodiments wherein the portions are applied in spaced intervals, each portion comprises about 10 to about 50 milliliters, 10-50 milliliters (e.g., 10, 15, 20, 25, 30, 35, 40, 45, or 50 milliliters), about 20 to about 30 milliliters, or 20-30 milliliters of planting mixture. In certain embodiments of the first and second embodiments, each portion is of equal or substantially equal size (i.e., having volumes that vary by no more than +/−10%). In certain embodiments of the first and second embodiments, each portion of plant mixture contains about 5 to about 500 or 5-500 treated guayule seeds (e.g., 5, 10, 15, 20, 25, 30, 35, 40, 45, 50, 75, 100, 125, 150, 175, 200, 225, 250, 275, 300, 325, 350, 375, 400, 425, 450, 475, or 500 treated guayule seeds), preferably about 5 to about 50 or 5-50 treated guayule seeds.

According to the processes of the first and second embodiments, the rate at which the planting mixture is applied to the soil may vary. In certain embodiments of the first and second embodiments, the planting mixture is applied at a rate of about 30 gallons to about 200 gallons or 30-200 gallons (e.g., 30, 40, 50, 60, 70, 80, 90, 100, 110, 120, 130, 140, 150, 160, 170, 180, 190 or 200 gallons) of planting mixture per acre of field and in other embodiments about 75 gallons to about 100 gallons or 75-100 gallons of planting mixture per acre of field. In certain embodiments of the first and second embodiments, the planting mixture is applied at a rate of about 110 liters to about 750 liters or 110-750 liters (e.g., 110, 120, 130, 140, 150, 160, 170, 180, 190, 200, 250, 300, 350, 400, 450, 500, 550, 600, 650, 700, or 750 liters) of planting mixture per acre of field and in other embodiments about 280 liters to about 380 liters or 280-380 liters of planting mixture per acre of field. In certain embodiments of the first and second embodiments, the planting mixture is applied at a rate sufficient to spread about 0.05 to about 5 kilograms or 0.05-5 kilograms (e.g., 0.05, 0.06, 0.07, 0.08, 0.09, 0.1, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.5, 3, 3.5, 4, 4.5, or 5 kilograms) of treated guayule seeds per acre of field, about 0.05 to about 2 kilograms or 0.5-2 kilograms of treated guayule seeds per acre of field, preferably about 0.1 to about 0.5 kilograms or 0.1-0.5 kilograms of treated guayule seeds per acre of field, via the planting mixture; in certain embodiments of the first and second embodiments, the planting mixture is applied at one of the foregoing rates in terms of kilograms of treated guayule seeds per acre of field in combination with on the foregoing rates in terms of gallons of planting mixture per acre of field.

As mentioned above, according to the processes of the first and second embodiments disclosed herein, portions of the planting mixture are applied to the exposed surface of the soil of the field. By stating that the portions are applied to the surface of the soil is meant that the planting mixture is placed upon the surface of the soil rather than the guayule seed itself being planted into or beneath the surface of the soil. In certain embodiments of the first and second embodiments, the surface of the soil contains one or more depressions onto which the portions are placed; when present such depressions extend no more than 1 inch into the soil and generally will have a depth of about 1 to about 0.125 inches, 1-0.125 inches (e.g., 1 inch, 0.9 inches, 0.8 inches, 0.7 inches, 0.75 inches or ¾ inch, 0.6 inches, 0.5 inches or ½ inch, 0.4 inches, 0.3 inches, 0.2 inches, 0.125 inches or ⅛ inch, or 0.1 inches), about 0.125 to about 0.75 inches, 0.125-0.75 inches, preferably about 0.2 to about 0.5 inches or 0.2 to 0.5 inches. In certain embodiments of the first and second embodiments, the surface of the soil contains one or more depressions onto which the portions are placed; when present such depressions extend no more than 2.5 centimeters into the soil and generally will have a depth of about 2.5 to about 0.3 centimeters, 2.5-0.3 centimeters (e.g., 2.5, 2.2, 2, 1.8, 1.5, 1.2, 1, 0.8, 0.5, 0.3, or 0.2 centimeters), about 0.3 to about 2 centimeters, 0.3-2 centimeters, preferably about 0.5 to about 1.2 centimeters. By stating that the surface of the soil is exposed is meant that bare soil is available for the portions to be placed upon or applied to. In certain embodiments of the first and second embodiments, the field soil onto which the portions are applied has been prepared for planting by one or more of plowing, discing, leveling, listing, or bed-shaping. In certain embodiments of the first and second embodiments, the prepared soil comprises rows of furrows and beds (with the furrows separating the beds) and the portions of the plant mixture are applied to the beds. In certain embodiments of the first and second embodiments, the beds are raised beds which have a surface height about 2 to about 8 inches above, 2-8 inches above, about 4 to about 6 inches above, or 4-6 inches above the depth of the furrows between the rows; in certain such embodiments each raised bed is about 10 to about 60 inches wide, or 10-60 inches wide (e.g., 10 inches, 20 inches, 24 inches, 25 inches, 30 inches, 35 inches, 36 inches, 40 inches, 45 inches, 48 inches, 50 inches, 55 inches, or 60 inches). In certain embodiments of the first and second embodiments, the beds are raised beds which have a surface height about 5 to about 20 centimeters above, 5-20 centimeters above, about 10 to about 15 centimeters above, or 10-15 centimeters above the depth of the furrows between the rows; in certain such embodiments each raised bed is about 25 to about 150 centimeters wide or 25-150 centimeters wide (e.g., 25, 30, 35, 40, 50, 55, 60, 65, 70, 75, 80, 85, 90, 95, 100, 110, 120, 130, 140, or 150 centimeters wide). Generally, the bed or raised bed will have a flat surface rather than a peaked or triangular surface.

According to the first and second embodiments, the day or days of the year when the portions of the planting mixture are applied to the soil may vary. In certain embodiments of the first and second embodiments, the portions of the planting mixture are applied on a day or days when the mean daily air temperature ranges from 50 to 90° F. (e.g., 50, 55, 60, 65, 70, 75, 80, 85, or 90° F. or 10 to 32° C. (e.g., 10, 12, 14, 16, 18, 20, 22, 24, 26, 28, 30, or 32° C.). Planting during a period of time when the mean daily air temperature is between the foregoing ranges will be more favorable to germination of the guayule seeds than planting when the mean daily air temperature is lower or higher.

Treated Guayule Seeds

As mentioned above, the guayule seeds which are applied to the soil of the field according to the processes of the first and second embodiments are treated guayule seeds. By treated guayule seeds is meant that the seeds have been exposed to a seed germination treatment. The particular type or types of seed germination treatment used to treat the guayule seeds may vary. Generally, the seed germination treatment will comprise a treatment which breaks dormancy and increases germination (speed of germination, success rate of germination, or both) of the seed. In certain embodiments of the first and second embodiments, the seed germination treatment comprises a chemical treatment. Various seed germination treatments are known to those of skill in the art and can be applied to guayule seeds. In certain embodiments of the first and second embodiments, the seed germination treatment comprises application of and/or soaking of guayule seeds with at least one of the following: (a) water, (b) plant growth regulator such as gibberellic acid (e.g., GA3, GA7, GA4); (c) potassium nitrate (i.e., $KNO_3$); (d) bleach solution (e.g., water solution of sodium hypochlorite (NaClO), calcium hypochlorite ($Ca(ClO)_2$, or a combination thereof at a concentration of 2-10% or 4-8%). Generally, when one or more of the foregoing is utilized as a seed germination treatment, liquid application is used (e.g., by dissolving the compound(s) in water or another liquid solvent).

In those embodiments of the first and second embodiments wherein the seed germination treatment comprises use of a plant growth regulator such as discussed above, the concentration of the plant growth regulator in any liquid application may vary and the time of contact between the liquid and the guayule seeds may vary. In certain embodiments of the first and second embodiments, the concentration of plant growth regulator is about 0.1 mmoles/liter to about 1 mmoles/liter or 0.1-1 mmoles/liter (e.g., 0.1, 0.2, 0.3, 0.4, 0.5, 0.6, 0.7, 0.8, 0.9, 1 mmoles/liter), preferably about 0.4 mmoles/liter to about 0.8 mmoles/liter or 0.4-0.8 mmoles/liter; in certain embodiments of the foregoing, the liquid solvent utilized is water and the foregoing refers to the amount of plant growth regulator used per liter of water. In certain embodiments, gibberellic acid is dissolved in alcohol (e.g., isopropanol) prior to mixing with water. In certain embodiments of the first and second embodiments, the plant growth regulator is used at one of the foregoing concentrations and the guayule seeds are allowed to soak for about 0.5 to about 6 hours, or 0.5-6 hours (e.g., 0.5, 1, 1.5, 2, 2.5, 3, 3.5, 4, 4.5, 5, 5.5, or 6 hours), preferably 1 to about 3 hours or 1-3 hours; in certain such embodiments soaking is followed by draining and drying. According to the first and second embodiments, the particular method used for drying may vary. Exemplary methods of drying include drying at room temperature, drying in a seed dryer, and drying at outside ambient temperature (optionally in the sun); preferably, any drying method employed will utilize a temperature of no more than about 95° F. (no more than 35° C.). In certain embodiments of the first and second embodiments, gibberellic acid (e.g., GA3) is used at one of the foregoing concentrations and/or for one of the foregoing times.

In certain embodiments of the first and second embodiments, the treated guayule seeds further comprise (include) an insecticide treatment. In certain such embodiments, the insecticide treatment is applied to the guayule seeds as a coating. In certain embodiments of the first and second embodiments, insecticide is applied to the guayule seeds after the seed germination treatment. Various insecticides may be utilized according to the processes of the first and second embodiments, including, but not limited to clothianidin, acetamiprid, nitenpyram, nithiazine, and thiacloprid. One or more than one of the foregoing insecticides may be utilized, or one or more of the foregoing insecticides may be utilized in combination with another insecticide. In those embodiments of the first and second embodiments wherein an insecticide is utilized or present on the treated guayule seeds, the rate at which the insecticide is used may vary. In certain embodiments of the first and second embodiments, the insecticide is used at an active ingredient rate of 20 grams to 150 grams (e.g., 20, 25, 30, 35, 40, 45, 50, 55, 60, 65, 70, 75, 80, 85, 90, 95, 100, 105, 110, 115, 120, 125, 130, 135, 140, 145, or 150 grams) per 150 grams of seed, preferably 25 to 100 grams or 30 to 90 grams per 150 grams of seed. In certain embodiments of the first and second embodiments, the insecticide is used at an active ingredient rate in according with its registration label. When measuring or determining a rate of insecticide treatment, the guayule seed has preferably been dried to a moisture content of no more than about 10% by weight (e.g., 10%, 9%, 8%, 7%, 6%, 5%, 4%, 3%, 2%, or 1%) so that excess water is not included in the seed weight. Various drying methods may be utilized such as drying at room temperature, drying in a seed dryer, and drying at outside ambient temperature (optionally in the sun); preferably, any drying method employed will utilize a temperature of no more than about 95° F. (no more than 35° C.).

According to the processes of the first and second embodiments, there is no need for the treated guayule seeds to be allowed to sprout or start to sprout prior to applying them via the portions to the soil of the field. Accordingly, in certain embodiments of the first and second embodiments, the treated guayule seeds that are applied via the portions of planting mixture to the field can be considered non-sprouted.

In certain embodiments of the processes of the first and second embodiments, the guayule seeds which are treated have been cleaned to increase the density of viable seed in a given quantity. Such cleaning may generally include removal of non-seed plant matter (e.g., flowers and leaves) and/or removal of less dense seed. In certain embodiments of the processes of the first and second embodiments, the guayule seeds which are treated have a density which is quantified by a measurement referred to as 100 seed weight. This measurement refers to the weight (in grams) of 100 seeds. In certain embodiments of the processes of the first and second embodiments, the guayule seeds which are treated have a 100 seed weight of at least 0.04 grams. In certain embodiments of the processes of the first and second embodiments, the guayule seeds which are treated have a 100 seed weight of 0.04 grams to 0.1 grams (e.g., 0.04, 0.05, 0.06, 0.07, 0.08, 0.09, or 0.1 grams), preferably 0.05 grams to 0.1 grams. The 100 seed weights referred to herein can be determined by determining the weight of 100 seeds, preferably after drying the seeds to a moisture content of no more than 10% by weight. In certain embodiments of the processes of the first and second embodiments, the process includes a step of providing a quantity of guayule seeds having a 100 seed weight as described above and then treating the quantity of seeds (i.e., with a seed germination treatment and/or with an insecticide, as discussed above).

Seed Starting Mixture

As mentioned above, the processes of the first and second embodiments disclosed herein utilize a planting mixture which comprises treated guayule seeds and a seed starting mixture. According to the first and second embodiments, the particular components of the seed starting mixture may vary. In certain embodiments of the first and second embodiments, a majority by volume of the seed starting mixture comprises peat, plant fiber (e.g., coir, pine or other bark, rice hulls, or a combination thereof), or a combination thereof. In certain embodiments of the first and second embodiments, a majority by volume of the seed starting mixture comprises peat. In certain embodiments of the first and second embodiments, a majority by volume of the seed starting mixture comprises coir. In certain embodiments of the first and second embodiments, the majority by volume of the seed starting mixture which is peat, plant fiber, or a combination thereof is at least 55%, at least 60%, at least 65%, at least 70%, at least 75%, at least 80%, at least 85%, at least 90%, at least 95%, 55-95%, or 60-90% by volume. In certain embodiments of the first and second embodiments, a majority by volume of the seed starting mixture comprises: (a) peat, plant fiber, or a combination thereof and (b) perlite, vermiculite, or a combination thereof. In certain embodiments of the first and second embodiments, a minority by volume of the seed starting mixture comprises one or more of: vermiculite, perlite, compost, sand, fertilizer, wetting agent, or an alkaline agent. In certain embodiments of the first and second embodiments, the seed starting mixture comprises a majority by volume of peat, plant fiber, or a combination thereof, in combination with a minority by volume of one or more of vermiculite, perlite, compost, fertilizer, or an alkaline agent. In certain embodiments of the first and second embodiments, the seed starting mixture comprises either no sand (i.e., is free of sand) or it contains a limited amount of sand. Limited amounts of sand may correspond to no more than 10% by volume, no more than 5% by volume, or even no more than 1% by volume (based upon the total volume of the seed starting mixture).

In certain embodiments of the first and second embodiments, the seed starting mixture comprises a wetting agent. One or more than one wetting agent may be utilized. Generally, a wetting agent can be understood as facilitating absorption of water into the seed starting mixture (or planting mixture). Various wetting agents are suitable for use in the seed starting mixture according to certain embodiments of the first and second embodiments, including, but not limited to: yucca, polyoxyethylene ester, ethoxysulfate, and combinations thereof.

In certain embodiments of the first and second embodiments, the seed starting mixture comprises a fertilizer. One or more than one fertilizer may be utilized. Various fertilizers are suitable for use in the seed starting mixture according to certain embodiments of the first and second embodiments, including, but not limited to, phosphorous-containing compounds, potassium-containing compounds, magnesium-containing compounds, nitrogen-containing compounds and combinations thereof. Exemplary phosphorous-containing fertilizers include, but are not limited to, bone meal, bone char, rock phosphate, and combinations thereof. Exemplary potassium-containing fertilizers include, but are not limited to, potassium-sulfate, green sand (also known as glauconite), and combinations thereof. Exemplary magnesium-containing fertilizers include, but are not limited to, Epsom salts, magnesium sulfate, and combinations thereof. Exemplary nitrogen-containing fertilizers include, but are not limited to, blood meal, crab meal, fish meal, plant meal, urea, ammonium sulfate, and combinations thereof.

In certain embodiments of the first and second embodiments, the seed starting mixture comprises an alkaline agent. One or more than one alkaline agent may be utilized. Various alkaline agents are suitable for use in the seed starting mixture according to certain embodiments of the first and second embodiments, including, but not limited to: limestone (e.g., aragonite, ag lime, hydrated lime, burnt lime, dolomitic lime, pelletized lime), gypsum, wood ash, and combinations thereof.

Planting Mixture/Mixing

As mentioned above, the planting mixture of the first and second embodiments comprises treated guayule seeds and a seed starting mixture. According to the process of the first embodiment, treated guayule seeds are mixed with a seed starting mixture to produce a planting mixture. According to the process of the second embodiment, a planting mixture comprising a combination of treated guayule seeds and seed starting mixture is provided. In certain embodiments of the first and second embodiments, the planting mixture consists of treated guayule seeds and seed starting mixture. In certain embodiments of the first and second embodiments, the planting mixture consists of treated guayule seeds and seed starting mixture and has an overall moisture content as discussed below (in such an embodiment the planting mixture can be understood as consisting of treated guayule seeds, seed starting mixture and moisture). According to the first and second embodiments, the relative amounts of treated guayule seeds and seed starting mixture in the planting mixture may vary. In certain embodiments of the first embodiment, the mixing of the treated guayule seeds with the seed starting mixture comprises mixing about 0.05 to about 5 kilograms or 0.05-5 kilograms (e.g., 0.05, 0.06, 0.07, 0.08, 0.09, 0.1, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.5, 3, 3.5, 4, or 5 kilograms), preferably 0.1 to about 0.5 kilograms or 0.1-0.5 kilograms of treated guayule seeds per 100 gallons of seed starting mixture. According to the first embodiment, methods for mixing or combination of the treated guayule seeds with the seed starting mixing are not particularly limited. In certain embodiments of the first embodiment, the mixing of the treated guayule seeds with the seed starting mixture comprises mechanical mixing; in certain such embodiments the mechanical mixing utilizes a mixer with a rotating drum, a mixer with an agitator, or a vertical mixer. In certain embodiments of the first embodiment, the treated guayule seeds are dried (e.g., to a moisture content of no more than 20% by weight) prior to mixing with the seed starting mixture. In certain embodiments of the first embodiment, the seed starting mixture is dried (e.g., to a moisture content of no more than 15% by weight) prior to mixing with the treated guayule seeds. In certain embodiments of the first embodiment, the treated guayule seeds have a moisture content of no more than 20% by weight, no more than 15% by weight, no more than 10% by weight, or no more than 5% by weight. In certain embodiments of the first embodiment, both the treated guayule seeds and seed starting mixture meet the foregoing moisture content prior to mixing to produce the planting mixture. In certain embodiments of the first embodiment, moisture is added during mixing to produce a planting mixture which has a moisture content as discussed below; in certain such embodiments, the moisture is added via addition of water, liquid fertilizer, or a combination thereof.

According to the processes of the first and second embodiments, the moisture content of the planting mixture may vary. Generally, any moisture present in the planting mixture will be limited to an amount which still allows the planting mixture to flow or pour (e.g., such as from a dispenser onto the field). In certain embodiments of the first and second embodiments, the moisture content of the planting mixture is about 10 to about 30 weight % or 10-30 weight % (e.g., 10 weight %, 15 weight %, 20 weight %, 25 weight %, 30 weight %), preferably about 15 to about 20 weight % or 15-20 weight %.

Fields and Soil

As mentioned above, the processes of the first and second embodiments comprise applying portions of the planting mixture to the soil of a field. According to the first and second embodiments, a field is provided which comprises soil with an exposed surface. The size of the field may vary, as discussed below. According to the first and second embodiments, the composition of the soil in the field may vary.

As mentioned above, the processes of the first and second embodiment comprise direct seeding of guayule seeds into a field and include providing a field comprising soil with an exposed surface. The field represents the location where the treated guayule seeds will germinate into seedlings and where those seedlings will grow into guayule shrubs (i.e., without any transplanting of the seedlings). The field also represents the location at which the guayule shrubs grown from the seedlings are ultimately harvested for their rubber-containing biomass. According to the first-third embodiments, the size of the field may vary, but will generally be greater than 1 acre in size. In certain embodiments of the first-third embodiments, the field is greater than 5 acres in size (e.g., 5-500, 5, 10, 20, 50, 100, 200, 300, 400 or 500 acres), greater than 10 acres in size, greater than 20 acres in size, or greater than 100 acres in size. The fields utilized in the processes of the first and second embodiments and present in the third embodiment contain soil that is exposed to the environment rather than being partially or entirely protected such as in a greenhouse.

As mentioned above, the third embodiment disclosed herein is directed to a field direct seeded with guayule according to the process of the first embodiment or the second embodiment. Depending upon the number of days that have passed from the time of applying the portions of planting mixture to the field, the field will contain guayule seedlings or guayule shrubs. Embodiments of the third embodiment corresponding to the results achieved by the processes of the first and second embodiment (e.g., planting intervals, soil in rows, etc.) should also be considered to be fully disclosed. Also included herein as the third embodiment are fields having the seedling and portion rates discussed infra with respect to the processes of the first and second embodiments.

Applying to the Soil

As mentioned above, the processes of the first and second embodiments comprise applying portions of the planting mixture to the soil. In certain embodiments of the first and second embodiments, the applying comprises mechanical application to the field, e.g., using one or more machines. In certain embodiments of the first and second embodiments, the mechanical application entails the use of a plug mix planter. A plug mix planter is designed to deposit plugs or portions of loose solids mixtures onto the soil of a field. Various plug mix planters are commercially available, including, but not limited to the model 900M Automatic (available with plug mix attachment) from Mechanical Transplanter Company, LLC (Holland, Mich.). In certain embodiments of the first and second embodiments, the applying comprises mechanical application using a tractor equipped with multiple plug mix planters (e.g., 2-12 plug mix planters) enabling application of the portions to multiple rows (e.g., 2-12 rows) at the same time. In certain embodiments of the first and second embodiments, the applying comprises mechanical application using a tractor equipped with a 2-12 row plug mix planter (e.g., 2, 3, 4, 5, 6, 7, 8, 9, 10, 11, or 12 rows), with a four-row plug mix planter, with an eight-row plug mix planter, with a ten-row plug mix planter or with a twelve-row plug mix planter.

According to the processes of the first and second embodiments, the rate at which the portions are applied to the soil of the field may vary. In certain embodiments of the first and second embodiments, the applying comprises mechanical application of the portions to at least 2 acres/hour of the field, preferably about 3 to about 4 acres/hour of the field; in certain such embodiments, the foregoing application rates utilize a four-row planter. In certain embodiments of the first and second embodiments, the applying comprises mechanical application of the portions to at least 4 acres/hour of the field, preferably about 6 to about 12 acres/hour of the field; in certain such embodiments, the foregoing application rate utilizes an eight-row planter or a twelve-row planter.

Pressing

As mentioned above, according to the processes of the first and second embodiments, after applying portions of the planting mixture to the soil, the portions are pressed. Thus, the processes of the first and second embodiments including pressing the portions of the planting mixture. Without being bound by theory, it is believed that pressing of the planting mixture is advantageous to germination of the guayule seeds by reducing loss and disturbance of the planting mixture (including guayule seeds) by wind and/or water. However, care must be taken during the pressing of the portions to ensure that the pressure applied does not push the guayule seeds within the portions too far beneath the surface or too far into the underlying soil which may hamper germination.

Generally, the pressing will entail pressing down or compressing of the portion into the soil by no more than about 1 inch, by no more than 1 inch (e.g., 1 inch, 0.9 inches, 0.875 inches or ⅞ inches, 0.8 inches, 0.75 inches or ¾ inches, 0.7 inches, 0.625 inches or ⅝ inches, 0.6 inches, 0.5 inches or ½ inch, 0.4 inches, 0.375 inches or ⅜ inches, 0.3 inches, 0.25 inches or ¼ inches, 0.2 inches, 0.125 inches or ⅛ inches, or 0.1 inches), by about ⅛ to about 1 inch, by ⅛ to 1 inch, by about ¼ to about ¾ inches, or by ¼ to ¾ inches. According to a metric scale, generally, the pressing will entail pressing down or compressing of the portion into the soil by no more than about 2.5 centimeters, by no more than 2.5 centimeters (e.g., 2.5, 2.2, 2, 1.8, 1.5, 1.2, 1, 0.8, 0.5, 0.3, or 0.2 centimeters), by about 0.3 to about 2.5 centimeters or 0.3-2.5 centimeters, by about 0.6 to about 1 centimeters, or by 0.6-1 centimeters. According to the first and second embodiments, various types of pressing may be utilized. In certain embodiments of the first and second embodiments, the pressing comprises pressing by rolling (e.g., by use of a wheel), by stamping, or a combination thereof.

Germination and Seedlings

As mentioned above, according to the processes of the first and second embodiments, the treated guayule seeds within the applied portions are allowed to germinate into seedlings. The seedlings will then grow (within the field) into guayule shrubs. Processes according to the first and second embodiment generally result in a relatively high germination rate. The germination rate can be measured in terms of the number of seedlings per portion (referred to herein as a seedling rate). In certain embodiments of the first and second embodiments, the seedling rate is at least 1 (e.g., 1, 2, 3, 4, 5, 6), preferably at least 2 or at least 4 seedlings/portion (referred to herein as a seedling rate). Processes according to the first and second embodiment may also result in a relatively high percentage of portions having treated guayule seeds germinating into seedlings (referred to herein as a portion rate). In certain embodiments of the first and second embodiments, the portion rate is at least 70% (e.g., 70%, 75%, 80%, 85%, 90%, 95%, 98%, 99%, or even 100%), at least 80%, or at least 90% (e.g., 90%, 91%, 92%, 93%, 94%, 95%, 96%, 97%, 98%, 99%, 99.5% or even 100%). In certain embodiments of the first and second embodiments the portion rate is as high as at least 95% or at least 98%. The portion rate can be understood as the percentage of portions having two or more seedlings emerge. Both the seedling rate and the portion rate can be determined by counting of seedlings in a representative quantity of portions in the field (e.g., 100 portions) or by averaging at least 5 representative quantities of such portions from the field. The seedling rate and portion rate are preferably determined 8-10 days after the portions of planting mixture were applied to the soil; when attempting to measure both rates they should be determined upon the same day. A range of more than one day is provided since counting may need to be conducted during more than one day, and/or sections of a given field may have been planted over the course of a couple of days. To the extent that it is deemed necessary to conduct the counting on a single day, it should be conducted upon the $9^{th}$ day after planting. As used herein, a seedling will have at least two cotolyden leaves (spread apart or open) and a root portion (radicle) extending into the soil. Measurements of the number of seedlings per portion or the percentage of portions having seedlings taken more than 10 days after the portions of planting mixture were applied to the soil may yield lower measurement rates due to seedlings dying from any combination of factors (e.g., excessive water, too little water, fungus, pests).

Irrigating

In certain embodiments of the first and second embodiments, the process further comprises irrigating to apply water to the treated seeds within the portions of the field. In those embodiments of the first and second embodiments wherein irrigation is utilized, the type of irrigation may vary. Exemplary forms of irrigation that may be suitable include, but are not limited to, center pivot (also known as central pivot), linear move, traveling gun, solid set (portable), permanent set, micro-irrigation (e.g., drip or micro-sprinkler), drip irrigation (e.g., surface drip, subsurface drip), furrow, basin, or border. In certain embodiments of the first and second embodiments, the irrigation comprises overhead irrigation; in certain such embodiments, the overhead irrigation comprises central pivot irrigation or solid-set irrigation. In certain embodiments of the first and second embodiments, the irrigation comprises surface irrigation; in certain such embodiments, the surface irrigation comprises furrow irrigation, basin irrigation, or border irrigation. Surface irrigation generally refers to irrigation whereby the water is distributed by gravity over the surface of a field. In certain embodiments of the first and second embodiments, irrigation is applied within 2 day(s) of applying the portions to the field; in certain such embodiments, irrigation is applied for an additional 5-8 days in an amount sufficient to maintain the surface of the soil and pressed portions moist (although preferably the creation of standing water is avoided). As non-limiting examples, irrigation may be applied on each of days 1-8 after applying the portions to the field or on each of days 2-7 after applying the portions to the field.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that different ratios of treated guayule seeds to seed starting mixture, other seed starting mixtures, other seed germination treatments, as well as different methods of applying and different methods of pressing other than those utilized in the Examples can be utilized (i.e., as fully disclosed in the preceding paragraphs).

Direct Seeding Trial A: In September to October 2014, eight samples of planting mixture were prepared using varying amounts of treated guayule seed (as provided in Table 1 below) in combination with a seed starting mixture. The seed starting mixture was a commercially available seed starting mix, either Jiffy brand Natural & Organic Seed Starting Mix or Sun Gro® brand. The guayule seeds were obtained from Bridgestone Agro Operations Research Farm (and had been harvested from a field of their guayule shrubs). The treated guayule seed had been prepared by soaking in 0.6 millimolar gibberellic acid solution for 2 hours at room temperature, followed by drying for approximately 15 hours at room temperature. In preparing the gibberellic acid solution, solid GA3 powder was directly added to water to the indicated molarity. Dried, treated guayule seed was mixed with seed starting mixture using an electric, portable concrete mixer, with a mixing time of about 2 minutes.

TABLE 1

|  | Concentration of treated seed in seed starting mixture (kg/100 gallons) |
|---|---|
| Sample 1 | 0.25 |
| Sample 2 | 0.5 |
| Sample 3 | 1 |
| Sample 4 | 2 |
| Sample 5 | 4 |
| Sample 6 | 6 |
| Sample 7 | 8 |
| Sample 8 | 12 |

Within two days after preparation of the planting mixtures, each planting mixture was applied to a separate section of a prepared field (located in Eloy, Ariz.) using model 900M Automatic plug mix attachments from Mechanical Transplater Company, LLC (Holland, Mich.). A farm tractor was equipped with a pull-behind apparatus having four of the plug mix attachments configured to apply portions of the planting mixture to rows of the soil surface which had been prepared into beds spaced 40 inches apart and at an in-row spacing of 12 inches apart. Each portion was approximately 30 milliliters in volume of planting mixture and was applied to a depression of about 0.25 inches in depth which had formed by the plug mix attachment. The planting mixture was applied at an application rate of about 100 gallons of seed planting mixture per acre of field, resulting in seeding rates which varied from 0.25 kilograms treated guayule seed/acre to 12 kilograms treated guayule seed/acre. Each planting mixture was applied on the same day. Each plug mix attachment on the tractor was also configured with a wheel to allow for pressing of the portion into the soil. The pressing occurred with sufficient pressure to leave behind an indentation of approximately 0.25 inches upon the top of the beds.

After application of the portions, each field was overhead irrigated using a central pivot. Water was applied via the irrigation system for 3-5 hours per day during the first seven days in order to keep the soil surface moist, but without creating standing water on the top of the beds.

Beginning 8 days after application of the first portions to the soil, the number of seedlings in each of 100 spots for each planting rate was counted and the percentage of these spots with at least one seedling was counted. Counting was completed upon the 10th day after application of the first portions to the soil had begun. Results of the counting appear below in Table 2, with Planting Rate 1 corresponding to measurements from the application of portions of Sample 1, Planting Rate 2 corresponding to measurements from the application of portions of Sample 2, etc. Seedlings were counted if they had at least two cotyledon leaves (spread apart or open) and a root portion (radicle) extending into the soil.

TABLE 2

|  | Seedlings per spot | Spots with seedling (%) |
|---|---|---|
| Planting Rate 1 | 4.3 | 97 |
| Planting Rate 2 | 12.0 | 100 |
| Planting Rate 3 | 14.3 | 100 |

TABLE 2-continued

|  | Seedlings per spot | Spots with seedling (%) |
|---|---|---|
| Planting Rate 4 | 48.2 | 100 |
| Planting Rate 5 | 101.1 | 100 |
| Planting Rate 6 | 84.1 | 100 |
| Planting Rate 7 | 78 | 100 |
| Planting Rate 8 | 92.8 | 100 |

The guayule seedlings in the 8 sections of field were allowed to grow. Beginning at 13.5 months after application of the portions, monthly samples of shrubs from a 10-foot section of bed (harvested by cutting the shrub off at the soil surface) were taken from the highest and lowest planting rates (0.25 kg/acre and 12 kg/acre, respectively). At the same time that the monthly samples were taken from the highest and lowest planting rates, samples were also taken from a field containing guayule shrubs grown from transplanted seedlings that had been transplanted at the same time as direct seeding occurred. Both the transplanted and direct-seeded guayule was managed in the same way once in the field. The guayule shrubs grown from transplanted seedlings can be understood to represent a comparative or control example. Based upon the mass of the respective samples, a biomass per acre was calculated. Results appear below in Table 3 (wherein data is provided in pounds/acre).

TABLE 3

|  | 0.25 kg/ acre rate | 12 kg/ acre rate | Transplants |
|---|---|---|---|
| 13.5 months | 12100 | 11530 | 10340 |
| 14 months | 11450 | 11870 | 9500 |
| 15 months | 10800 | 9810 | 11210 |
| 16 months | 9770 | 8240 | 9340 |
| 17 months | 8150 | 8350 | 7780 |

As can be seen from the data of Table 3, in each month listed above the biomass/acre collected from the 0.25 kg/acre rate section of field varied by no more than 3.5% from the biomass/acre collected from the 12 kg/acre rate section of field. Taking into account the inherent variation within each section of field as well as the precision of the measurement, the two planting rates can be considered to yield equivalent amounts of biomass. Moreover, by average the 0.25 kg/acre and 12 kg/acre planting rates yielded 8.6% and 3.9% more biomass, respectively, compared to the transplanted guayule.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A process for direct seeding of guayule seeds into a field comprising
   a. providing treated guayule seeds and a field comprising soil with an exposed surface,
   b. mixing the treated guayule seeds with a seed starting mixture to produce a planting mixture comprising about 0.05 to about 5 kg of the treated guayule seeds per 100 gallons of seed starting mixture,
   c. applying portions of the planting mixture to the exposed surface of the soil,
   d. pressing the portions of the planting mixture, and
   e. allowing the guayule seeds applied in step (d) to germinate into seedlings, wherein the seed starting mixture comprises a majority by volume of peat, plant fiber, or a combination thereof, wherein the seed starting mixture further comprises a minority by volume of one or more of vermiculite, perlite, compost, fertilizer, or an alkaline agent.

2. The process of claim 1, wherein the mixing step (b) comprises about 0.05 to about 4 kilograms of the treated guayule seeds per 100 gallons of seed starting mixture, and the applying step (c) is at a rate of about 100 gallons of planting mixture per acre of field.

3. The process of claim 1, wherein the applying step (c) is at a rate of about 30 to about 200 gallons of planting mixture per acre.

4. The process of claim 1, further comprising irrigating the pressed portions.

5. The process of claim 1, wherein the treated guayule seeds are considered treated due to having been subjected to gibberellic acid treatment.

6. The process of claim 5, wherein the treated guayule seeds have been further subjected to treatment with an insecticide selected from at least one of clothianidin, acetamiprid, nitenpyram, nithiazine, and thiacloprid.

7. The process of claim 1, wherein the portions applied in step (c) are applied in spaced intervals to rows of soil wherein each row is spaced about 20 to about 80 inches apart, and portions within rows are spaced about 0.5 to about 36 inches apart.

8. The process of claim 7, wherein the portions applied in step (c) each contain about 5 to about 500 treated guayule seeds.

9. The process of claim 8, wherein the portions applied in step (c) each comprise about 10 to about 50 milliliters of planting mix.

10. The process of claim 1, wherein the portions applied in step (c) are applied in a continuous strip to rows of soil wherein each row is spaced about 20 to about 80 inches apart.

11. The process of claim 10, wherein the rows of soil further comprise one or more depressions upon which the portions in step (c) are applied.

12. The process of claim 1, wherein step (c) comprises mechanical application to at least 2 acres/hour of the field.

13. A field direct seeded with guayule according to the process of claim 1.

14. A process for direct seeding of guayule seeds into a field comprising
    a. providing a field comprising soil with an exposed surface,
    b. providing a planting mixture comprising a combination of treated guayule seeds and seed starting mixture wherein the treated guayule seeds are present in an amount of about 0.05 to about 5 kilograms per 100 gallons of seed starting mixture,
    c. applying portions of the planting mixture to the exposed surface of the soil,
    d. pressing the portions of the planting mixture into the soil, and
    e. allowing the guayule seeds applied in step (c) to germinate into seedlings, wherein the seed starting mixture comprises a majority by volume of peat, plant fiber, or a combination thereof, wherein the seed starting mixture further comprises a minority by volume of one or more of vermiculite, perlite, compost, fertilizer, or an alkaline agent.

15. The process of claim 14, wherein the mixing step (b) comprises about 0.05 to about 4 kilograms of the treated guayule seeds per 100 gallons of seed starting mixture, and the applying step (c) is at a rate of about 100 gallons of planting mixture per acre of field.

16. The process of claim 14, wherein the treated guayule seeds are considered treated due to having been subjected to gibberellic acid treatment.

17. The process of claim 16, wherein the treated guayule seeds have been further subjected to treatment with an insecticide selected from at least one of clothianidin, acetamiprid, nitenpyram, nithiazine, and thiacloprid.

18. The process of claim 14, wherein the portions applied in step (c) are applied in spaced intervals to rows of soil wherein each row is spaced about 20 to about 80 inches apart, and portions within rows are spaced about 0.5 to about 36 inches apart.

19. The process of claim 14, wherein the portions applied in step (c) each contain about 5 to about 500 treated guayule seeds.

20. The process of claim 18, wherein the rows of soil further comprise one or more depressions upon which the portions in step (c) are applied.

21. A process for direct seeding of guayule seeds into a field comprising
   a. providing treated guayule seeds and a field comprising rows of soil with an exposed surface and depressions within the rows, wherein the treated guayule seeds have been subjected to at least one of gibberellic acid treatment, clothianidin, acetamiprid, nitenpyram, nithiazine, or thiacloprid,
   b. mixing the treated guayule seeds with a seed starting mixture to produce a planting mixture comprising about 0.05 to about 5 kg of the treated guayule seeds per 100 gallons of seed starting mixture,
   c. applying portions of the planting mixture to the depressions of the rows of soil, wherein each portion contains about 5 to about 500 treated guayule seeds and about 10 to about 50 milliliters of planting mixture, and the applying is at a rate of about 30 to about 200 gallons of planting mixture per acre
   d. pressing the portions of the planting mixture, and
   e. allowing the guayule seeds pressed in step (d) to germinate into seedlings, wherein the seed starting mixture comprises a majority by volume of peat, plant fiber, or a combination thereof, wherein the seed starting mixture further comprises a minority by volume of one or more of vermiculite, perlite, compost, fertilizer, or an alkaline agent.

* * * * *